Jan. 1, 1952     C. W. WOLD     2,581,060
SWITCH CONTROL

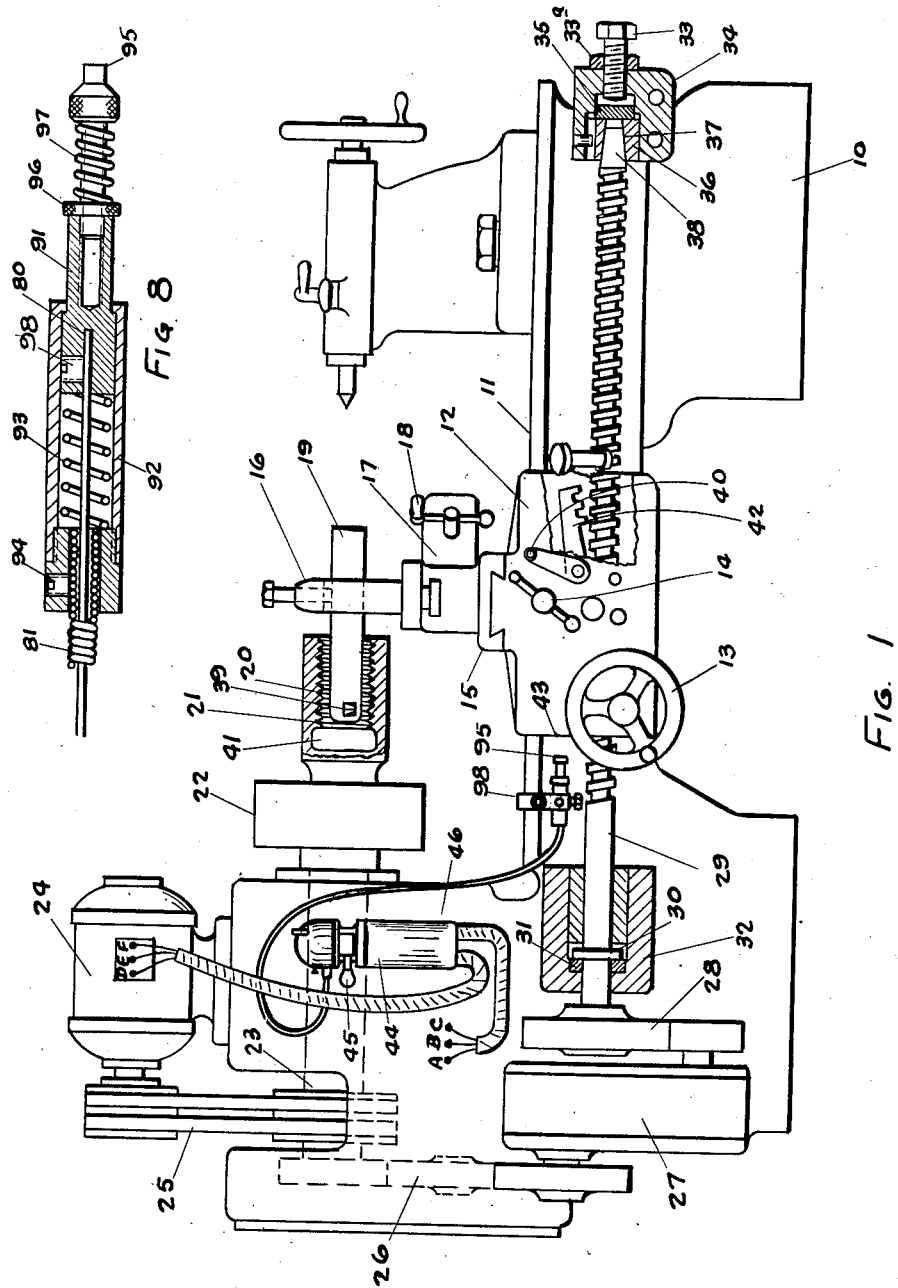

Filed Dec. 13, 1945     4 Sheets-Sheet 2

CLARENCE W. WOLD Inventor

By Lyon & Lyon

Attorneys

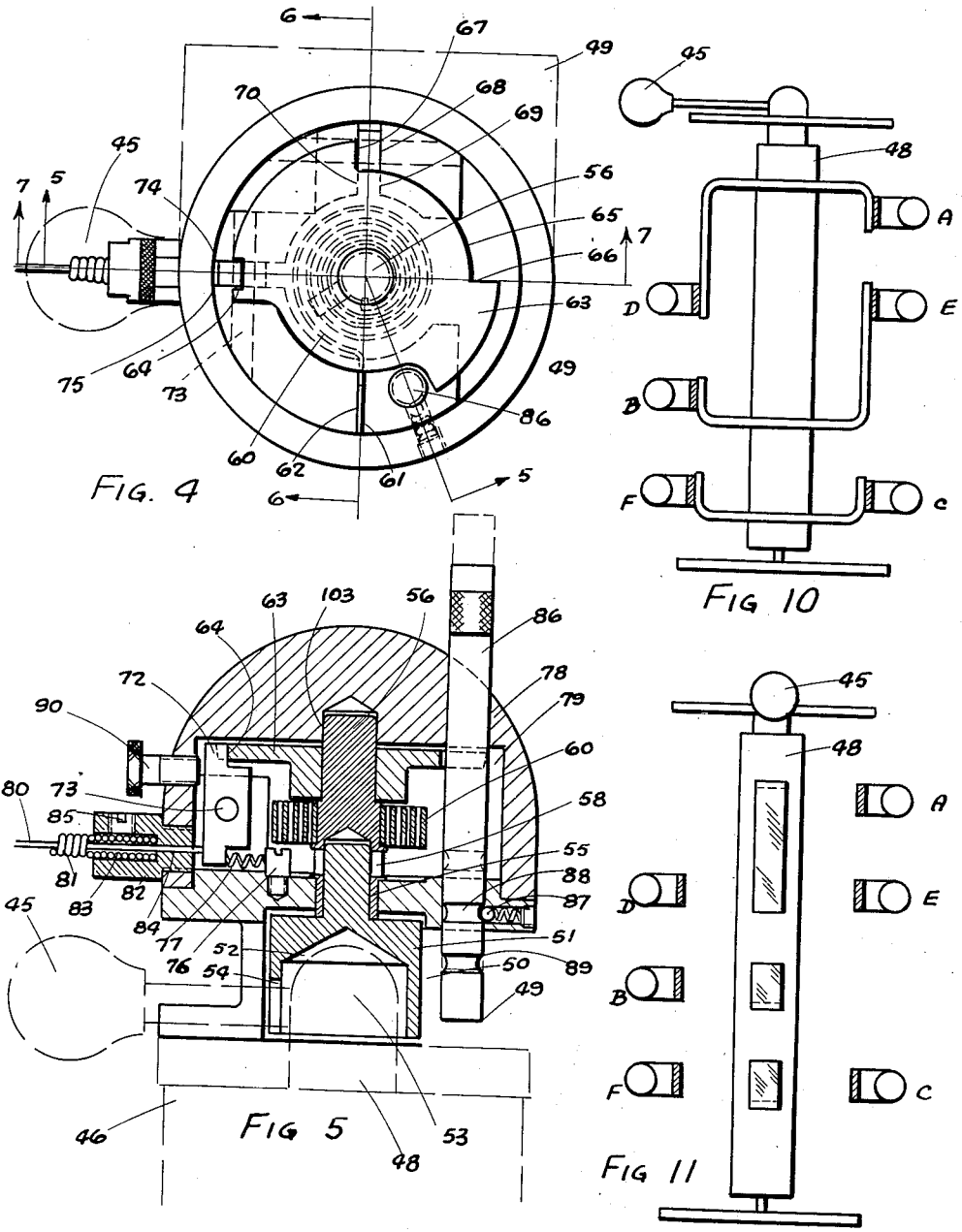

Jan. 1, 1952

C. W. WOLD
SWITCH CONTROL 2,581,060

Filed Dec. 13, 1945

CLARENCE W. WOLD Inventor

By Lyon & Lyon

Attorneys

Patented Jan. 1, 1952

2,581,060

UNITED STATES PATENT OFFICE 2,581,060

SWITCH CONTROL

Clarence W. Wold, Whittier, Calif., assignor, by mesne assignments, to Carl P. Leu, Martin A. Leu, Clarence Wold, and Adolf A. Unger, all of Whittier, Calif., a partnership Application December 13, 1945, Serial No. 634,646

9 Claims. (Cl. 74—2)

This invention relates to a switch control and in its broader aspects is directed to the control of a driving motor in connection with power operated devices including machine tools, threading machines, tapping machines, etc.

This invention also finds particular usefulness in threading operations such as are performed on a lathe.

The principal object of this invention is to provide a novel form of switch control for use in connection with an electric motor. Another object is to provide a switch control for reversing the direction of rotation or feed, or both, of power operated machines. Another object is to provide a novel form of switch control for reversing the feed of a machine tool in response to feeding motion to a predetermined point, and which will repeat the reversing operation indefinitely with relatively great accuracy with respect to the preselected point for reversal.

Another object is to provide a novel form of control for a rotary reversing switch, which control is actuated by an element positioned remotely from the switch.

Other objects and advantages will appear hereinafter.

In the drawings:

Figure 1 is an elevational view in diagrammatic form showing an application of a preferred embodiment of this invention to a conventional form of lathe.

Figure 4 is a plan view of a preferred form of switch control embodying my invention, the cover being removed.

Figure 5 is a sectional elevation taken substantially on the lines 5—5 as shown in Figure 4 and illustrating the mechanism in latched position.

Figure 8 is an elevation, partly in section, showing details of construction of the contact unit employed in connection with the device shown in the other figures of the drawings.

Figures 10, 11 and 12 are diagrammatic views illustrating the action of the rotary reversing switch. Figure 10 shows the switch in "Forward" position, Figure 11 illustrates the same parts with the rotor turned to the "Off" position, and Figure 12 illustrates the rotor turned to bring the contacts to the "Reverse" position.

Figure 3:
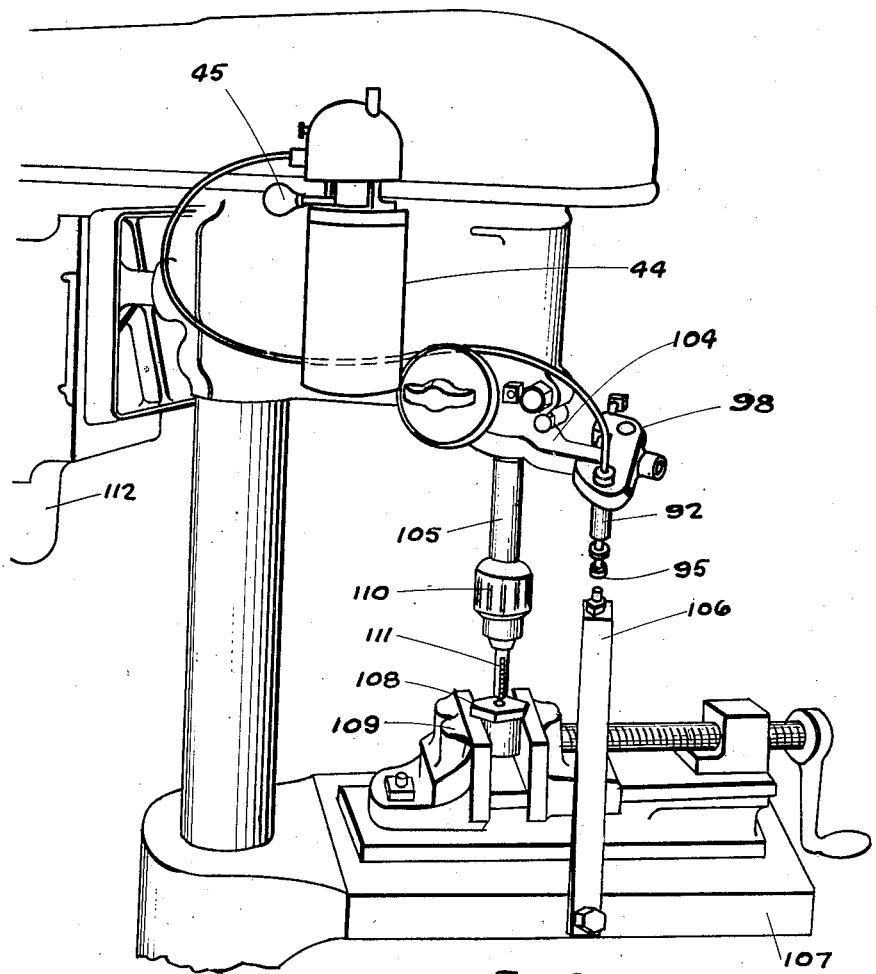
Figure 3 is a perspective view showing an adaption of a device embodying my invention for use in a tapping operation as performed on a drill press.
Figure 2:
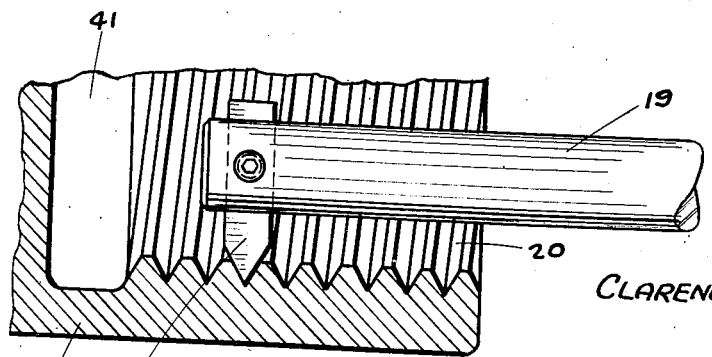
Figure 2 is a fragmental section of a portion of the device shown in Figure 1, illustrating an internal threading operation on an enlarged scale.

The switch control embodying my invention will be described in detail to disclose the individual parts of the mechanism employed and also will be described in connection with its relation to a lathe and a drill press. It is to be understood that these two uses for my improved switch control are illustrative only and are not intended as limiting the field to which this invention is applicable.

In Figure 1 a conventional form of lathe generally designated 10 is provided with the usual lathe bed 11, along which a carriage 12 is adapted to travel. The usual hand wheel 13 is provided for traversing the carriage 12 along the lathe bed 11. The control handle 14 is provided for moving the compound rest in a manner well understood in the art. A boring bar 19 is carried by the tool post 16 and, as shown in Figure 1, extends into the bore 20 of a work piece 21. The work piece is supported and driven from the usual chuck 22 secured on the spindle 23. The spindle 23 is rotatably mounted on the frame of the lathe 10 in the usual manner. A 3-phase electric motor 24 is provided for driving the spindle through the V-belts 25. A gear train 26 driven from the spindle 23 drives the gears (not shown) within the gear box 27, which in turn acts to rotate the drive gear 28 secured to the lead screw 29. A collar 30 formed integrally on the lead screw 29 cooperates with the thrust washer 31 within the housing 32 to act as a thrust bearing for limiting endwise movement of the lead screw 29 in a direction toward the gear box 27. Endwise movement of the lead screw 29 in a direction away from the gear box 27 is limited by the lead screw adjustment element 33. The element 33 is threaded within the housing 34 and engages a slidably mounted disc 35. A slidable bearing collar 36 is provided which has a conical bore 37 for the reception of the conical bearing 38 on the right-hand end of the lead screw 29. Adjustment of the member 33 serves to adjust the end play of the lead screw between the conical bearing 37 and the thrust bearings 30, 31.

In the operation of the lathe shown in Figure 1, the pointed cutting tool 39 carried by the boring bar 19 is adapted to cut internal threads in the bore 20 of the work piece 21. With the motor 24 turning to operate the spindle and the lead screw 29, the conventional lever 40 is actuated to engage the follower 42 to cause the lead screw 29 to traverse the carriage 12 and thereby move the boring bar 19 into the bore 20. The crank lever 14 is turned to bring the pointed cutting tool 39 into contact for the proper depth of cut for the first pass. When the pointed tool 39 reaches the end of the bore 20 and enters the thread relief 41, the contact element 95 is engaged by a wall portion 43 of the carriage 12. This action serves to trip the mechanism within the switch control unit generally designated 44 and thereby effect reversal of the driving motor 24. This action reverses the direction of rotation of the lead screw 29. The element 33 has been previously adjusted to provide the exact amount of end play for the lead screw, which, together with the back lash in the gear train 26, gear box 27, etc., permits the work piece 21 to rotate reversely for one complete revolution before the carriage 12 and pointed tool 39 reverse the direction of feed. When exactly one complete revolution of the work piece is completed, the carriage 12 moves the pointed tool back through the same thread groove which it cut previously in its forward motion. When the tool 39 has been completely withdrawn from the bore 20, the operator manually moves the control lever 45 to the forward position, thereby again effecting forward rotation of the work piece and forward traversing of the carriage 12. Before the tool 39 enters the bore 20, the operator turns the feed handle 14 for the cross slide 15 a sufficient amount for the second pass, and hence the depth of the thread groove in the bore 20 is increased. Three or four passes of the tool may be required to complete the finished thread form. Each time the pointed tool enters the thread relief 41, the contact element 42 actuates the switch control unit 44 to reverse both rotation and feed.

From a consideration of this method of operation, it is apparent that the operator is able to form the complete thread within the bore 20 by progressive movement of the cross feed control lever 14, alternated with operation of the control lever 45, and without repeated actuation of the lever 40 to engage and disengage the follower 42. The troublesome problems of feeding the pointed tool into and away from the work piece at opposite ends of the thread length are thus completely eliminated, since the operator is only required to progressively advance the cross feed lever 14.

Figure 12:
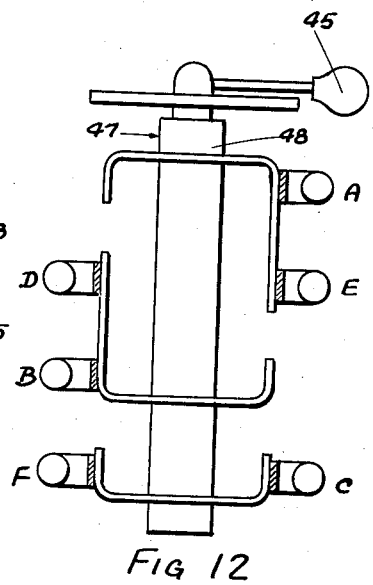

The above general description outlining the use of the switch control unit 44 in connection with thread cutting operations on a lathe will be supplemented hereinafter following the description in a preferred embodiment of the switch control unit 44. As shown in the drawings, a control switch housing 46 is mounted in any convenient location on the base of a machine tool such as a drill press or a lathe and may inclose a convenient form of rotary reversing switch for 3-phase current. As shown diagrammatically in Figures 9 to 12, the controller switch generally designated 47 is provided with a rotor 48 adapted to be turned within the housing 46 by the lever 45. The three leads from the power supply A, B, C are connected to the motor leads D, E, F in one position of the rotor 48 (Figure 10), and to the motor leads E, D, F in another position of the rotor 48 (Figure 12). It will be understood that the reversal of two of the three leads results in reversing the direction of rotation of the 3-phase motor operated from the leads D, E, F. The rotor 48 has an intermediate position (Figure 11) in which the power supply leads A, B, C are completely disconnected from the motor leads D, E, F. The particular switch construction illustrated in Figures 10, 11 and 12 is not essential for the practice of this invention but shows merely a convenient form of rotary reversing switch.

Secured to the upper end of the switch housing 46 by any convenient means is a body member 49 having an opening 50 for the reception of a rotary connector 51. The connector in turn has a central recess 52 for clearance around the upper end 53 of the rotor 48. The actuating lever 45 extends laterally from the projecting end 53 through a lateral slot 54 formed in the wall of the connector 51. The connector 51 is rotatably supported co-axially of the rotor 48 by means of the bore 55 formed in the end of the shaft 56. It will be understood from the description of the above parts that rotary movement of the handle 45 for effecting the switching operations serves to cause dependent rotation of the connector 51. A laterally projecting pin 57 is secured in the upper end of the connector 51 and provides a lost motion rotary connection between the connector 51 and the co-axial shaft 56. The shaft 56 has a bore 55 for the reception of the upper end of the connector 51 and a lateral slot 58 milled through the wall of the shaft into the bore 55. This slot 58 is of sufficient length to permit the pin 57 and connector 51 to rotate throughout approximately one half revolution independently of the shaft 56. A flat spring 60 having one end secured to the shaft 56 and the other end projecting laterally into engagement with the abutment 62 on the body 49 is continuously coiled around the shaft 56. Secured on the shaft 56 is a control wheel 63 having a notch 64 and a cutaway segment 65 bounded by the stop shoulders 66 and 67. The action of the coil spring 60 is to urge the shaft 56 and control wheel 63 to rotate in a counter-clockwise direction as viewed in Figure 4. Arranged to operate within the cutaway segment 65 between the stop shoulders 66 and 67 is a stop element 68 supported on the pin 71 between the abutments 69 and 70. The pin 71 passes through the stop element 68 and the abutments 69 and 70 to maintain the element 68 in position. It will be understood from this description that the coaction of the stop element 68 with the cutaway segment 65 in the control wheel 63 limits the rotation of the shaft 56 to one quarter revolution.

A latching lever 72 is pivotally supported on the bore 49 by means of the pin 73 and operates between the abutments 74 and 75 formed on the body 49. The upper end of the latching lever 72 is adapted to engage within the notch 64 in the control wheel 63 to prevent rotation of the shaft 56. A spring 77, which is confined between the lower end of the latching lever 72 and the set screw 76 attached to the body 49, acts to resiliently urge the latch lever 72 towards latching position within the notch 64. A cap member 78 is secured on the body member 49 by any convenient means (not shown) and provides a chamber 79 within the cap 78 for enclosing the operating parts of the device, and a bearing 103 for the upper end of the shaft 56.

Figure 6:
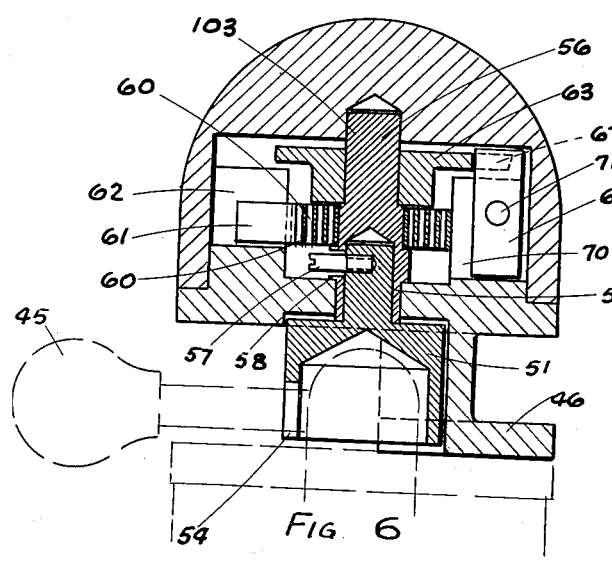
Figure 6 is a sectional elevation taken substantially on lines 6—6 as shown in Figure 4.
Figure 7:
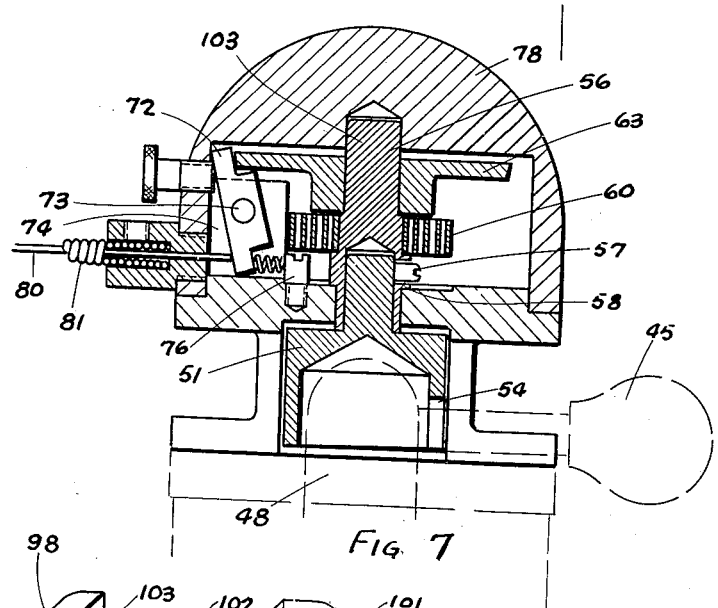
Figure 7 is a sectional elevation taken substantially on line 7—7 as shown in Figure 4, but with the mechanism in the unlatched position.
Figure 9:
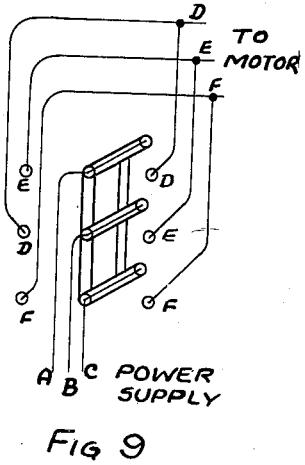
Figure 9 is a wiring diagram of the reversing switch employed in connection with this invention.

Means are provided for tripping the latch means in order to disengage the latching lever 72 from the notch 64, and, as shown in the drawings, this means includes a flexible high strength wire 80, such as a piano wire, operating within a flexible cable 81. A fitting 82 is secured to a side wall of the cap 78 and is provided with a recess 83 for the reception of the flexible cable 81 and port 84 for sliding contact with the wire 80. A set screw 85 is provided for securing the flexible cable 81 in position with the recess 83. It will be understood from this description that lateral motion of the wire 80 to the right as viewed in Figure 5 will result in turning the latching lever 72 about its supporting pin 73 to disengage the latching lever 72 from the slot 64. Such movement of the wire 80 moves the latching lever 72 from the position shown in Figure 5 to the position shown in Figure 7. As a result of this tripping action, the spring 60 rotates the shaft 56 and control wheel 63 until the stop element 68 engages the stop shoulder 66. The position of the slot 58 with respect to the notch 64 is such that the pin 57 and connector 51 are mechanically driven through one quarter revolution to a position in which the lateral slot 54 in the connector 51 is intermediate the position shown in Figures 6 and 7. Rotation of the connector 51 drives the control lever 45 and rotor 48 of the reversing switch. Although the spring 60 rotates the shaft 56 through only one quarter revolution, the inertia of the connnector 51, control lever 45, rotor 48 and its associated gear is sufficient to carry the rotor 48 and connector 51 to the position illustrated in Figure 7. The lost motion connection provided by the pin 57 and slot 58 enables the connector 51 and rotor 48 to continue rotation due to inertia after the control wheel 63 has been positively stopped by the element 68.

Figures 4, 5, 6 and 10 of the drawings illustrate the control switch mechanism in the "Forward" position. Actuation of the wire 80 to the right moves the latching lever 72 to the position shown in Figures 7 and 12, which is the "Reverse" position. Means are provided for arresting rotation of the lever 45 and rotor 48 at the "Off" position diagrammatically illustrated in Figure 11, and, as shown in the drawings, this means includes a vertically adjustable selector pin 86 passing through openings provided in the base 49 and cap 78. A spring urged ball 87 is mounted within the body 49 and adapted to engage a detent 88 or detent 89 which is longitudinally spaced on the selector pin 86. The position of this pin 86 as shown in Figure 4 is such that when the pin is in its lower position the lower end of the pin engages the lever 45. This arrests rotation of the lever 45 and the rotor 48 when the switch mechanism is in the "Off" position illustrated in Figure 11. With the pin 86 in its upper position, the lever 45 passes under the end of the pin 86 to the "Reverse" position previously described.

It will be apparent from a consideration of the construction of the switch control unit 44 that manual movement of the lever 45 from the "Off" position to the "Forward" position serves to bring the latching member 72 into engagement with the notch 64, although when the spring operated mechanism is in its cocked position, the lever 45 is still available for manual actuation of the reversing switch, since the connector 51 is free to move through one half revolution independently of the shaft 56. A set screw 90 may be provided if desired in the wall of the cap 78 for locking the latching lever 72 in latching position.

Figure 13:
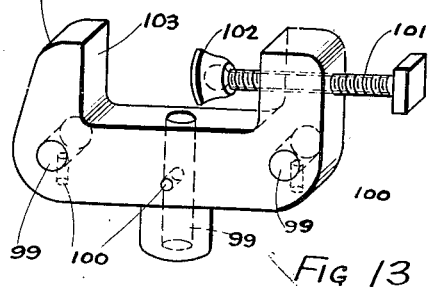
Figure 13 is a perspective view showing a preferred form of clamp as used in connection with the contact assembly shown in Figure 8.

One end of the actuating wire 80 contacts the latching member 72 and the other end is secured within a piston 91 by means of a set screw 98 (see Figure 8). Piston 91 reciprocates within a cylinder 92 containing a coil spring 93. A flexible cable 81, which encloses the wire 80, is secured relative to the cylinder 92 by means of a set screw 94. A contact piece 95 is threadably received by the projecting end of the piston 91 and a lock nut 96 is provided for securing the contact element 95 in selected position relative to the piston 91. A coil spring 97 may be provided if desired. A clamp 98 shown in Figure 13 is provided with a series of openings 99 for reception of the cylinder 92, and a set screw 100 is provided at each of the openings 99 for securing the cylinder 92 therein. A bolt 101 is threaded through one of the arms of the clamp and is provided with a universally swiveling abutment 102. In operation, the clamp is secured to any conventional location on the base of the machine by clamping a portion of the machine between the abutment 102 and the shoulder 103.

In the operation of the switch control assembly in connection with a thread cutting operation such as is shown in Figure 1, the end play of the lead screw 29 is accurately adjusted prior to commencing production operations. The clamp 98 is secured to the lathe bed 11 in a location to bring the contact element 95 into position for contact with the carriage surface 43 just before the boring bar 19 strikes the blind end of the recess 41. With the motor 24 turning the work piece 21 and the lead screw 29, the follower element 42 is engaged to make the first pass of the cutting tool 39 in the bore 20. When the cutting tool 39 has completed its first pass and enters the recess 41, the contact element 95 is engaged by the surface 43, tripping the latch mechanism in the switch control unit 44 and reversing the electrical leads to the motor 24 in the manner described above. The motor therefore reverses the drive to the work piece 21 and to the control screw 29. The control lever 45 is then manually moved to the "Off" position by the operator to arrest rotation of the motor 24 and hence to stop the work piece 21 and the lead screw 29 after the work piece 21 has rotated exactly one revolution in the reverse direction. The operator then exerts a clockwise torque on the hand wheel 13 without disengaging the follower element 42 from the lead screw 29. This serves to take up all backlash in the reverse direction. While exerting this force against the hand wheel 13, the lead screw adjusting element 33 and the lock nut 33a are relaxed sufficiently to bring the point of the tool 39 exactly midway between the sides of the thread groove previously cut on the first pass. The adjusting element 33 and lock nut 33a are then retightened.

After this initial set-up operation has been completed, subsequent passes of the cutting tool 39, in progressively forming the final thread within the bore 20, are each automatically reversed when the contact element 95 is engaged by the shoulder 43 on the carriage 12. Actuation of the contact element 95 causes the control switch unit 44 to reverse the motor and work piece 21. After one complete reverse revolution of the work piece 21, the accumulated backlash in the gearings 26, 27 and 28, plus the backlash provided by end play of the lead screw 29, serves to reverse the direction of travel of the carriage 12 at precisely the moment that the thread form previously cut is "in step" with the motion of the tool 39. The tool 39 then travels idly in the reverse direction through the thread groove previously cut. It will be noted that the procedure for progressively cutting a thread with a pointed tool requires that the delay between reversal of the work piece and reversal of the feed element be very accurately timed and be capable of repetition without any appreciable error. It has been found from experience that the device illustrated in the drawings under production conditions will repeat within .001 inch with regard to position of reversal.

While the threading operation has been described in connection with the formation of an internal thread, it will be understood that the same procedure is followed for cutting an external thread.

In the application of a switch control unit 44 to a drill press, as shown in Figure 3, the mode of operation of the device is similar to that described in connection with the lathe thread cutting procedure with the exception that no delay is provided between the reversal of rotation and the reversal of feed. As shown in Figure 3, the clamp 98 is secured to a bracket 104 which is attached to the reciprocable head within the drill press. The cylinder element 92 is attached to the clamp 98 in a position parallel to the axis of rotation of the spindle 105. A stop piece 106 is secured to the base 107 and is adapted to be contacted by the contact element 95.

The operation chosen for illustration in connection with the drill press is that of tapping an internal thread in the work piece 108. A conventional form of vise 109 is mounted on the base 107 and is adapted to hold the work piece 108 in position for the tapping operation. The usual chuck 110 holds a conventional tap 111 in position. Manual movement of the control lever 45 to the position shown in Figure 3 serves to energize the motor 112 for forward rotation and thereby turning the spindle 105 in the forward direction for the tapping operation. The spindle is fed downwardly by a conventional means (not shown) until the tap 111 engages within the work piece 108. The rotation of the tap then serves to advance the tap into the work piece. The relative position of the contact element 95 is so adjusted with respect to the stop piece 106 that, when the tap 111 has reached its lowest position, the control switch unit 44 will reverse the direction of rotation of the motor 112 and spindle 105. The micrometer adjustment provided for the contact element 95 permits a very close setting for determining the limit of feeding motion of the tap 111, and the switch control unit 44 acts with such precision that a bottoming tap may be used in a blind hole in the work piece 108 without fear of twisting off the tap 111 or failure to form a complete thread to the bottom of the hole. Reversal of the spindle 105 is thus accurately controlled with regard to the depth of feed, and when reversal is effected the tap backs out of the tap hole automatically. It will be apparent to those skilled in the art that this manner of precise control for a tapping operation is vastly superior to the conventional practice of marking a line on the tap 111 which approximately corresponds to the maximum depth of insertion of the tap, or the practice of employing a small wire wrapped around the tap at the approximately correct elevation.

It will be noted from the description of my switch control unit in connection with the lathe shown in Figure 1 and the drill press shown in Figure 3 that the advantages arising from the automatic reversal feature do not impair normal manual actuation of the reversing switch; thus, the control lever 45 is available at all times to the operator for manual actuation of the reversing switch, should such actuation be necessary or desirable. Furthermore, the reversing switch unit 44 may be mounted in any convenient location on the machine it controls and need not be mounted ear the cutting tool or tap, etc. The flexible cable 81, together with the wire 80, may be made any convenient length so that the relatively small contact unit 92 may be placed anywhere on the machine. It is to be understood that a hydraulic cable could be substituted for the wire 80 and cable 81 for performing the same function.

Having fully described my invention, it is to be understood that I do not wish to be limited to the details herein set forth, but my invention is of the full scope of the appended claims.

I claim:

1. In combination with an electric reversing switch having a stationary base and a movable control member manually operable about an axis from one position to another position, operating means for the control member comprising a rotary shaft, a body attached to the switch base and rotatably supporting the shaft, a connector non-rotatably associated with said switch control member and having a lost motion rotary connection with said shaft, a spring within the body adapted to rotate the shaft, an element secured on said shaft and provided with a shoulder, a latch carried on the body resiliently urged to engage said shoulder to prevent rotation of the shaft by the spring, and trip means adapted to move the latch out of engagement with said shoulder to permit the spring to turn the shaft, said trip means including a slidable element positioned remote from said body.

2. In combination with an electric reversing switch having a stationary base and a movable control member manually operable about an axis from one position to another position, operating means for the control member comprising a rotary shaft, a body attached to the switch base and rotatably supporting the shaft, a connector non-rotatably associated with said switch control member and having a lost motion rotary connection with said shaft, a spring within the body adapted to rotate the shaft, a latch wheel secured on said shaft and provided with a notch, a latch pivotally mounted on the body and adapted to engage the notch to prevent rotation of the shaft by the spring, and trip means adapted to move the latch out of the notch, said trip means including a slidable element positioned remote from said body.

3. In combination with an electric reversing switch having a stationary base and a rotary control member, operating means for the control member comprising a rotary shaft, a body attached to the switch base and rotatably supporting the shaft, a connector non-rotatably associated with said switch control member and having a lost motion rotary connection with said shaft, a spring encircling and adapted to rotate the shaft, a latch wheel secured on said shaft and provided with a notch, a latch pivotally mounted on the body and adapted to engage the notch to prevent rotation of the shaft by the spring, trip means adapted to move the latch out of the notch, and stop means associated with the body and latch wheel for limiting rotary movement of the shaft.

4. Operating means for an electric reversing switch having a stationary base and a movable control member manually operable about an axis from one position to another position, comprising a rotary shaft adapted for operative connection to the control member, a body adapted to be attached to the switch base and rotatably supporting the shaft, means providing a lost motion rotary connection between the control member and said shaft, a spring within the body adapted to rotate the shaft, an element secured on said shaft and provided with a shoulder, a latch carried on the body resiliently urged to engage said shoulder to prevent rotation of the shaft by the spring, and trip means adapted to move the latch out of engagement with said shoulder to permit the spring to turn the shaft, said trip means including a slidable element positioned remote from said body.

5. Operating means for an electric reversing switch having a stationary base and a movable control member manually operable about an axis from one position to another position, operating means for the control member comprising a rotary shaft adapted for operative connection to the control member, a body adapted to be attached to the switch base and rotatably supporting the shaft, means providing a lost motion rotary connection between the control member and said shaft, a spring within the body adapted to rotate the shaft, a latch wheel secured on said shaft and provided with a notch, a latch pivotally mounted on the body and adapted to engage the notch to prevent rotation of the shaft by the spring, and trip means adapted to move the latch out of the notch, said trip means including a slidable element positioned remote from said body.

6. Operating means for an electric reversing switch having a stationary base and a rotary control member, comprising a rotary shaft adapted for operative connection to the control member, a body adapted to be attached to the switch base and rotatably supporting the shaft, means providing a lost motion rotary connection between the control member and said shaft, a spring encircling and adapted to rotate the shaft, a latch wheel secured on said shaft and provided with a notch, a latch pivotally mounted on the body and adapted to engage the notch to prevent rotation of the shaft by the spring, trip means adapted to move the latch out of the notch, and stop means associated with the body and latch wheel for limiting rotary movement of the shaft.

7. Operating means for an electric reversing switch having a stationary base and a movable control member manually operable about an axis from one position to another position, comprising a rotary shaft adapted for operative connection to the control member, a body adapted to be attached to the switch base and rotatably supporting the shaft, means providing a lost motion rotary connection between the control member and said shaft, a spring within the body adapted to rotate the shaft, an element secured on said shaft and provided with a shoulder, a latch carried on the body resiliently urged to engage said shoulder to prevent rotation of the shaft by the spring, trip means adapted to move the latch out of engagement with said shoulder to permit the spring to turn the shaft, said trip means including a slidable element positioned remote from said body, and a flexible wire adapted to actuate the trip means in response to actuation of the slidable element.

8. Operating means for a drum type of reversing switch having a housing with a rotor projecting therefrom, and a manually movable lever affixed to and extending laterally from the projecting end of the rotor and operable about an axis from one position to another, including: a body adapted to be affixed to the switch housing, a connector rotatable in the body and adapted to embrace the switch lever so that rotation of the connector effects rotation of the lever from one position to another; a shaft for rotating the connector within the body; a lost motion rotary connection between the connector and the shaft, permitting manual operation of the lever independently of the shaft to move the lever to a position between the two aforementioned positions; power operated means for rotating the shaft contained within the body; and a control means for the power operated means extending exteriorly of the body.

9. Operating means for a drum type of reversing switch having a housing with a rotor projecting therefrom, and a manually movable lever affixed to and extending laterally from the projecting end of the rotor and operable about an axis from one position to another, including: a body adapted to be affixed to the switch housing, a connector rotatable in the body, provided with a recess to rotatably receive the projecting end of the switch rotor and a lateral slot to receive the switch lever so that by rotation of the connector, operation of the lever from one position to another can be effected; said slot of a width to permit manual movement of the lever independently of the connector to a position between the two aforementioned positions; power operated means for rotating the connector contained within the body; and a controlled means for the power operated means extending exteriorly of the body.

CLARENCE W. WOLD.

REFERENCES CITED

The following references are of record in the file of this patent:

UNITED STATES PATENTS

| Number | Name | Date |
|---|---|---|
| 501,068 | Haskins | July 11, 1893 |
| 635,496 | Matlack | Oct. 24, 1899 |
| 748,123 | Waterman | Dec. 29, 1903 |
| 755,822 | Whittlesey | Mar. 29, 1904 |
| 881,565 | Everett et al. | Mar. 10, 1908 |
| 937,559 | Weinberg | Oct. 19, 1909 |
| 1,008,593 | Fish | Nov. 14, 1911 |
| 1,805,434 | Young | May 12, 1931 |
| 1,831,187 | Mohr | Nov. 10, 1931 |
| 1,891,998 | Nafziger | Dec. 27, 1932 |
| 1,902,765 | Deitsch | Mar. 21, 1933 |
| 1,996,752 | Doan | Apr. 9, 1935 |
| 2,053,961 | Linde | Sept. 8, 1936 |
| 2,071,180 | Shaw | Feb. 16, 1937 |
| 2,136,642 | Starkweather | Nov. 15, 1938 |
| 2,203,298 | Granberg | June 4, 1940 |
| 2,295,853 | Ley | Sept. 15, 1942 |
| 2,309,299 | Bickel | Jan. 26, 1943 |
| 2,368,408 | Brooking | Jan. 30, 1945 |
| 2,376,164 | Miller et al. | May 15, 1945 |
| 2,395,586 | Scott | Feb. 26, 1946 |
| 2,414,191 | Coon | Jan. 14, 1947 |

FOREIGN PATENTS

| Number | Country | Date |
|---|---|---|
| 133,806 | Great Britain | Oct. 23, 1919 |
| 684,810 | Germany | Dec. 6, 1939 |